UNITED STATES PATENT OFFICE.

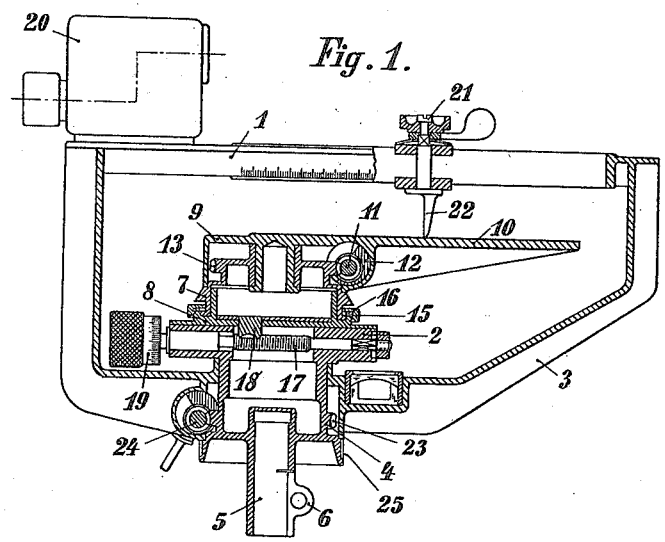

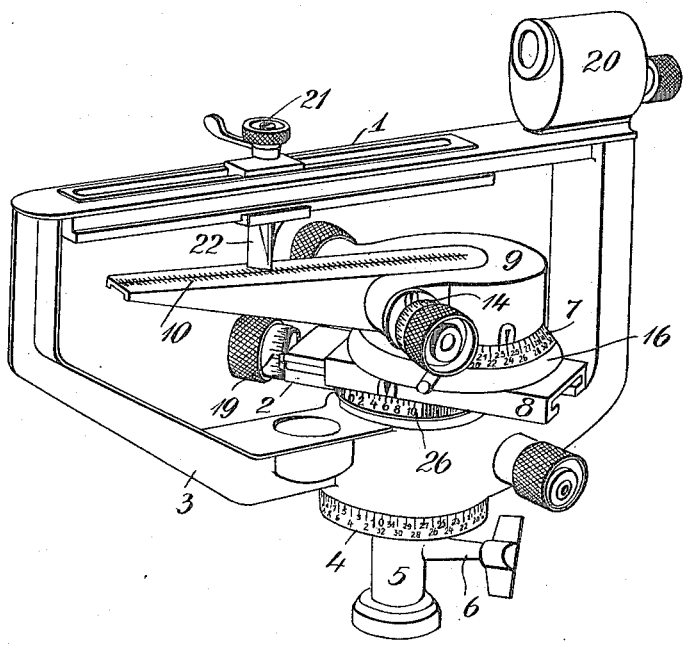

MAX GIESECKE, OF NEW YORK, N. Y., ASSIGNOR TO THE FIRM OF OPTISCHE ANSTALT C. P. GOERZ AKTIENGESELLSCHAFT, OF FRIEDENAU, NEAR BERLIN, GERMANY.

SURVEYING INSTRUMENT.

1,136,951. Specification of Letters Patent. Patented Apr. 27, 1915.

Application filed July 20, 1910. Serial No. 572,814.

*To all whom it may concern:*

Be it known that I, MAX GIESECKE, citizen of the German Empire, and resident of New York city, New York, in the United States of America, have invented certain new and useful Improvements in Surveying Instruments, of which the following is a specification.

This invention relates to triangle measuring instruments, and its object is to provide an improved instrument whereby an inaccessible side of a triangle (usually a geodetic triangle) can be ascertained with one of the adjacent angles, when the other two sides and the angle contained by them are known or can be directly measured.

The improved instrument belongs to the class wherein two rods or "rules" are used, adjustable in the directions of the two known triangle sides together with a third rule adjustable parallel to the inaccessible third triangle side, and its operation is based on the principle of ascertaining, in a triangle proportional to the geodetic triangle, the side corresponding to the unknown side of the latter triangle.

According to my invention, one of the rules, corresponding to the known base of the triangle, is pivotally connected to the second rule, corresponding to the known side of the triangle, and this first rule is also provided with a member slidable longitudinally along such rule, and upon which is pivotally mounted the third rule, corresponding to the unknown side of the triangle. An angle measurer is provided for measuring the angle between the first and third rules. The second rule is provided with an index, adjustable with reference to a scale on that rule, and the third rule is provided with a scale which may be read with reference to such index. A suitable sighting device is mounted upon the second rule. This arrangement enables the distance between the pivotal axes of the second and third rules to be varied according to the length of the bases of different triangles to be measured, and also enables the two relatively rotatable parts of the angle measuring device to be coupled with each other by means of worm gear so that the angle of adjustment can be accurately read off a cylindrical scale or drum, and that the adjustment of the angle measuring device on the rule carrying it can at the same time be effected without requiring any computation.

An embodiment of the invention is shown in the annexed drawings, in which:—

Figure 1 shows a side elevation and partial central vertical section of one form of instrument embodying my invention, the three measuring rules of the instrument being all shown as pointed in the same direction. Fig. 2 shows a plan view of the instrument, and shows rule 2 turned to approximately right angles with respect to rule 1, and further shows the slide 8 moved out from zero position, and rule 10 occupying an oblique position, parts being shown therefore in a position into which they may be adjusted in use for determining the length and the direction of the unknown side of a triangle. Fig. 3 shows a perspective view of the instrument, the parts thereof being rotated in positions such as they might occupy in actual use.

In the construction shown on the drawing the two rules adjustable in the directions of the known triangle sides are marked 1 and 2. The rule 1 corresponding to the known side of the triangle is part of a frame 3 rotatable about the main pivot 4 of the instrument, which can be mounted on a support by means of a socket 5, and made fast by means of a clamping device, of which only a lug 6 is shown in the drawing. The rule 2, corresponding to the known base of the triangle on which rule the angle measuring device is slidable is fixed to the pivot 4. The angle measuring device is inclosed by the frame 3 and comprises an arc 7 carried by a slide 8 movable on the rule 2, and a part 9 rotatable relatively to the arc 7, said part 9 being provided with the index belonging to the arc 7, and having an extension 10 which forms a rule, corresponding to the unknown side of the triangle marked with a scale. The two relatively rotatable parts 7 and 9 of the measuring device are coupled with each other by means of a worm 11, which can be disengaged in known manner from a rack 13 by means of an eccentric bearing 12, and which carries a drum 14 with a scale on its circumference. 15 is a screw ring which enables the part 7 of the angle measuring device to be coupled with the slide 8 by means of a clamping ring 16. 17 is a screw which is engaged with a nut segment 18 on the slide 8, and carries a peripheral scale 19 for accurate adjustment.

20 is the sighting device mounted on the rule 1, that is to say on the frame 3, and 21 is a pivot which is adjustable in a slot in the rule 1 and carries a rotatable index 22. The main pivot 4 has a rack 23 engaged by a worm wheel 24 by means of which the frame 3 can be rotated relatively to the pivot 4, and the rotation can be read off a scale 25 on the main pivot.

The operation of the instrument is as follows: Let it be assumed the instrument is so placed that its main pivot is at the corner of the triangle at which the two known sides (or two sides measurable by available measuring instruments) meet, and that the remote, inaccessible side is to be ascertained. When this instrument has been so placed the rule 1 is adjusted parallel to the rule 2, which position can be ascertained by means of scale 25 and the angle measuring device is adjusted on the rule 2 so that its pivotal axis coincides with the axis of the pivot 4. The sighting device 20 is then trained on one of the other triangle corners, the distance of which is known, the training being effected by rotating the entire instrument on the pivotal support on which it is mounted by means of the socket 5. Thereupon the instrument is fixed to the pivotal support by means of the clamping device, the member 6 of which is shown in the drawing, so fixing the position of the rule 2, corresponding to the base of the triangle, then the frame 3, including the rule 1, is rotated about the main pivot 4 until the sighting device is trained on the third corner of the triangle, the distance of which from the instrument is also known or can be estimated. Thereupon the slide 8 is adjusted relatively to the rule 2 by rotation of the drum 19 until the displacement of the slide from zero position (the zero position being that in which the axis of the angle measuring device coincides with the axis of the pivot 4), amounts to a predetermined fraction of the distance of the point of observation from the corner first sighted, i. e., amounts to a predetermined fraction of the base of the geodetic triangle, the adjustment being made by a scale 26, (Fig. 3). Then the index pivot 21 is moved relatively to the rule 1 through the same fraction of the distance of the other remote triangle corner, the adjustment being made by a scale on the rule. Thereupon the third rule 10 is rotated by rotating drum 14 and worm 11 until a longitudinal line on the rule intersects the axis of index 22. The latter then points to that division on the rule 10, which indicates the length of the unknown triangle side, measured in units similar to the units of the scales on the two other rules. The accuracy of this measurement is due to the fact that when the above described adjustments have been made the three rules of the instrument make a triangle proportional to the geodetic triangle. The rotation of the rule 10 from its zero position also gives the angle at the remote corner first sighted.

The instrument is primarily intended for military purposes, principally for artillery work, in which case it serves, when firing from a masked position, for ascertaining range and direction from an auxiliary point of observation, the latter being the point at which the instrument is placed. The line from this auxiliary point of observation to the firing position constitutes the base line of the geodetic triangle to be determined, and its length will either be known or is capable of being determined readily and with accuracy. The line from the position of the observer to the point at which the fire is to be directed constitutes the so-called "known" side of the geodetic triangle, and the length of this side will in many cases be known accurately, or if not known can be estimated. The triangle side determined by means of the instrument denotes the range, the direction being given by the angle contained by the said side and the line between the instrument and gun.

Normally the part 7 of the angle measuring device is coupled with the slide 8, but these two parts can be uncoupled by rotating the ring 15, and thus unclamping the clamping ring 16. This allows of rotating the part 7 of the angle measuring device relatively to the pivot on the slide 8, on which it is mounted, and relatively to the part 9 carrying the rule 10, so that after each adjustment relatively to an object the part 7 can be readjusted so that the index is on the zero mark of the scale. After re-adjustment to zero position the part 7 is re-coupled with the slide 8. If the target is to be changed, it is only necessary to re-adjust upon the new target, the change of direction being directly given by the requisite re-adjustment of the rule 10, relatively to the zero-point of the angle measuring device.

What I claim is:

1. A surveying instrument for ascertaining an inaccessible side of a triangle of which the base is known and of which one side is known either approximately or absolutely, comprising three rules arranged for adjustment with relation to each other so as to form a triangle similar to the triangle the inaccessible side of which is to be determined, pivotal mountings for the first rule, corresponding to the base of such triangle, and for the second rule, corresponding to the approximately or absolutely known side of the triangle, such mountings having a common axis, a telescope sighting device mounted directly upon the second rule, the third rule having with the first rule a pivotal connection adjustable longitudinally along such first rule, such pivotal connection of the third rule comprising angle measuring means for measuring the angle between the first and third rules; whereby the distance between the points of pivotal connection of the second and third rules, to the first rule, may be adjusted according to the known length of the base of the triangle; the second and third rules being provided, the one with an index movable along its rule, and the other with a scale adapted for coaction with such index.

2. A surveying instrument comprising in combination a rule member, an angle measurer mounted thereon and slidable thereon in the direction of the rule of said rule member, and provided with a rotatable part, a second rule mounted on such rotatable part, and a frame rotatably related with respect to the first mentioned rule member, and inclosing said rule member and the angle measurer carried thereby, said frame provided with a third rule and with a sighting device.

3. A surveying instrument comprising a rule member, an angle measurer mounted thereon and slidable in the direction of the rule of said rule member and comprising a rotatable part, a second rule carried by the said rotatable part of said angle measurer, and a frame provided with a third rule and with a sighting device, said frame mounted rotatably on the first mentioned rule member, and a gear connection between said first mentioned rule member and the said frame.

4. A surveying instrument comprising two pivotally mounted rules having a common axis of rotation, and rotatable independently, a slide mounted for movement on one of said rules, an index movably mounted on the other of said rules, a third rule pivotally connected to said slide, and means for determining the angular position of such third rule with respect to the slide, said third rule provided with a scale adapted to coact with the said index, said third rule having no direct mechanical connection with said index or with the rule carrying such index.

5. A surveying instrument comprising in combination three rules, two of which are pivotally mounted with the same axis of rotation and are movable independently of each other, a slide adjustable along one said rule by distances proportional to one of two sides of a triangle, an index adjustable on the other rule to distances proportional to another side of a triangle, the third rule pivotally mounted on said slide and provided with a scale adapted for coaction with said index, and means for determining the varying angular position of said third rule with respect to said slide, said third rule having no direct mechanical connection with said index or with the rule carrying such index.

6. A surveying instrument comprising in combination three rules, two of which are pivotally mounted with the same axis of rotation, and are movable independently of each other, the third rule being pivotally connected to one of said first two rules, and said third rule and the other of said first two rules being without direct mechanical connection to each other and being provided, the one with a scale, and the other with an index, said scale and index adapted for coaction, the point of pivotal connection of said third rule to the rule to which it is pivoted being adjustable along such latter rule.

7. A surveying instrument comprising in combination three rules, two of which are pivotally mounted with the same axis of rotation, and are movable independently of each other, the third rule being pivotally connected to one of said first two rules, and said third rule and the other of said first two rules being without direct mechanical connection to each other, and being provided, the one with a scale, and the other with an index, said scale and index adapted for coaction, the point of pivotal connection of said third rule to the rule to which it is pivoted being adjustable along such latter rule, and gearing for shifting such point of pivotal connection.

8. A surveying instrument comprising in combination three rules, two of which are pivotally mounted with the same axis of rotation, and are movable independently of each other, the third rule being pivotally connected to one of said first two rules, and said third rule and the other of said first two rules being without direct mechanical connection to each other and being provided, the one with a scale, and the other with an index, said scale and index adapted for coaction, the point of pivotal connection of said third rule to the rule to which it is pivoted being adjustable along such latter rule, and screw mechanism for shifting such point of pivotal connection.

9. A surveying instrument comprising in combination three rules, two of which are pivotally mounted with the same axis of rotation, and are movable independently of each other, the third rule being pivotally connected to one of said first two rules, and said third rule and the other of said first two rules being provided, the one with a scale, and the other with an index, said scale and index adapted for coaction, the point of pivotal connection of said third rule to the rule to which it is pivoted being adjustable along such latter rule, and gearing for moving said third rule about its pivot.

10. A surveying instrument comprising in combination three rules, two of which are pivotally mounted with the same axis of rotation, and are movable independently of each other, the third rule being pivotally connected to one of said first two rules, and said third rule and the other of said first two rules being provided, the one with a scale, and the other with an index, said scale and index adapted for coaction, the point of pivotal connection of said third rule to the rule to which it is pivoted being adjustable along such latter rule, and a worm and worm wheel for moving said third rule about its pivot, and an eccentric mounting for said worm, whereby the worm may be thrown into and out of engagement with its worm wheel.

11. A surveying instrument comprising in combination three rules, two of which are pivotally mounted with the same axis of rotation, and are movable independently of each other, worm gearing for adjusting one of said two rules with respect to the other of said two rules, the third rule being pivotally connected to one of said first two rules, and said third rule and the other of said first two rules being provided, the one with a scale, and the other with an index, said scale and index adapted for coaction, the point of pivotal connection of said third rule to the rule to which it is pivoted being adjustable along such latter rule.

12. A surveying instrument comprising in combination three rules, one of said rules having a socket support whereby it may be rotatably mounted, another of said rules rotatably mounted upon said first named rule, said two rules provided with means whereby extent of angular movement of one with respect to the other may be determined, a slide movably mounted on said first named rule, the third of said rules being pivotally mounted on said slide, said slide and the rule mounted thereon being provided with means for determining the extent of angular motion of the rule with respect to said slide, said third rule and the second named rule being provided, the one with an index and the other with a scale, said index and scale adapted for coaction.

In testimony whereof I have signed this specification in the presence of two subscribing witnesses.

MAX GIESECKE.

Witnesses:
F. SCHMID,
ALFRED BOHM.

Copies of this patent may be obtained for five cents each, by addressing the "Commissioner of Patents, Washington, D. C."